July 21, 1931. N. TRBOJEVICH 1,815,685
WORM GEARING
Filed Aug. 6, 1928 2 Sheets-Sheet 1
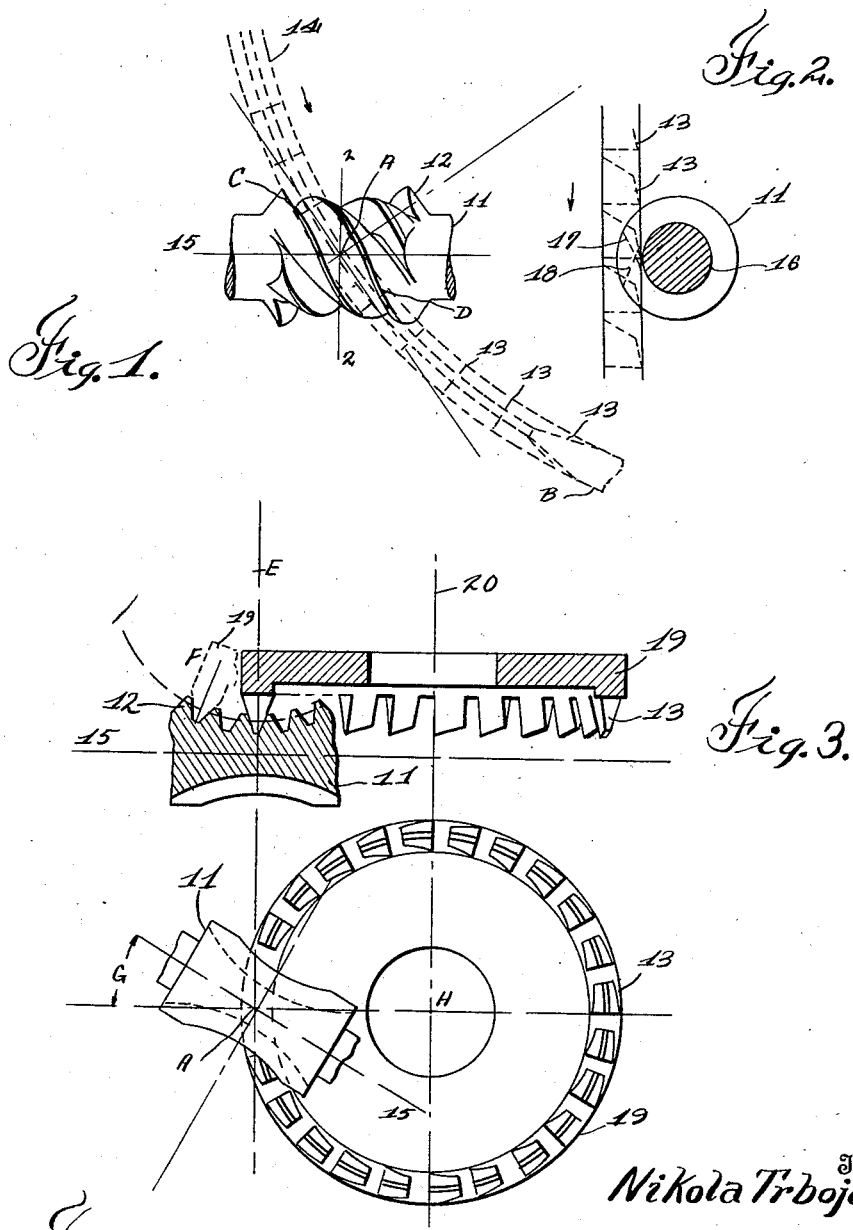

July 21, 1931. N. TRBOJEVICH 1,815,685
WORM GEARING
Filed Aug. 6, 1928 2 Sheets-Sheet 2
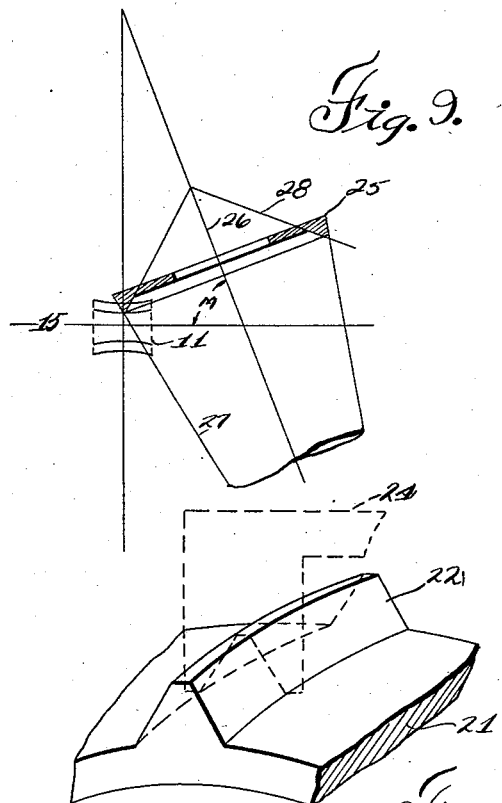
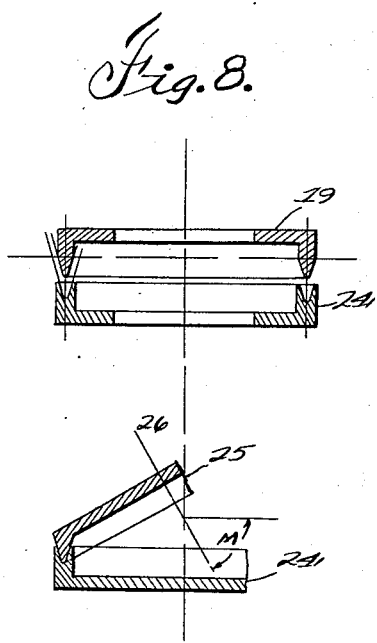
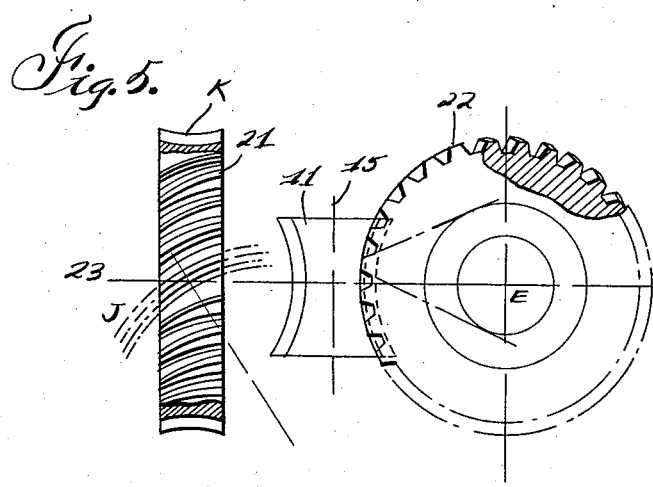
Inventor
Nikola Trbojevich
Attorneys Patented July 21, 1931

1,815,685

UNITED STATES PATENT OFFICE

NIKOLA TRBOJEVICH, OF HIGHLAND PARK, MICHIGAN, ASSIGNOR TO THE TIMKEN-DETROIT AXLE COMPANY, OF DETROIT, MICHIGAN, A CORPORATION OF OHIO

WORM GEARING

Application filed August 6, 1928. Serial No. 297,765.

The invention relates to an improvement in worm gearing and refers in particular to gearing of the Hindley or globoid type.

The history of this type of gearing shows that the worm members of such drives originally were made like true globoid screws having their threads of a constant pitch, contour and thickness in the axial or midplane. Dr. Lanchester improved upon this construction by adopting a worm member, the threads of which were generated by means of a large hoblike tool of the same pitch diameter as the mating worm gear, said generating tool having its cutting edges disposed above and below the midplane of the worm whereas prior to Lanchester all generating edges were in the midplane. Still further modifications were made by Bostock, Guest, Wildhaber and myself by attempting to generate the worm threads by means of disk cutters or by the equivalent means of a rack tool reciprocating in a straight line transverse to the axis.

In the present construction the globoid worms are generated by means of a rack or V-shaped tool but the tool does not move or reciprocate in a straight line transverse to the axis of the worm as formerly was suggested but moves in a circular path. In the following description it will be shown that this method while producing a more or less non-symmetrical thread contour in the worm is, nevertheless, theoretically correct providing the mating worm and gear are cut and assembled in their proper relative positions. The advantage of having the generating tool move in a circular path is mainly of a practical nature since it permits the use of a Gleason type face cutter instead of a reciprocating tool or disk cutter as heretofore for the generation of worm threads, thus simplifying the operation. It will be readily understood that a tool moving in a circular orbit and in a plane tangent to the work will return after each complete revolution of the cutter to its exact initial position and thus will act as a shaping surface thereby effecting the necessary generative action upon the worm threads.

The main objects of this invention are first to simplify the method of producing globoid worms; second to produce worms of such a shape that they may be readily ground in the threads after hardening; third to simplify the structure and the manufacture of the mating worm wheel.

This application refers more particularly to the worm gearing itself, while the method of generating gears forms the subject matter of a copending application.

In the drawings

Figure 1 is a diagram showing the method of generating a globoid worm by means of a shaping tool moving in a curved path;

Figure 2 is a section in the plane 2—2 thereof;

Figure 3 diagrammatically shows in elevation the method of generating the improved worm by means of a Gleason cutter;

Figure 4 is the plan view of Figure 3;

Figures 5 and 6 show two views of the improved worm gear capable of meshing with the improved worm;

Figure 7 shows on an enlarged scale the formation of a single tooth of the worm gear shown in Figures 5 and 6;

Figure 8 shows two complementary cutters, one for the improved worm and the other for the gear, intended to cooperate;

Figure 9 shows a modification of the method in which a special conical cutter is employed;

Figure 10 shows the profile formation of the conical cutter depicted in Figure 9.

The basis of this invention will be best understood from Figures 1 and 2. The globoid worm 11 having a plurality of threads or teeth 12 is acted upon by means of a series of rack shaped tools 13 all moving in the circular orbit 14. The cross section of said shaping tool is shown at B, Figure 1. The generation of worm threads is completed in this manner: While the tools 13 move continuously in their orbit 14, the worm 11 rotates about its axis 15 and is also simultaneously translated in a timed relation in the midplane in a circular orbit. The midplane is perpendicular to the sheet of paper in Figure 1 and passes through the axis 15, while the center of the last named orbit coincides with the center of mating wheel.

As shown in Figure 2, the tools 13 move in a tangential direction relative to the momentary root circle 16, from which it follows that the said tools will produce the maximum depth of cut at the instant when they pass through the midplane of the worm. However, they will also remove metal both on approach and recess due to the well known "helical interference" which cannot be avoided in such methods of generating. Thus, geometrically, the formed thread surfaces of the worm are the envelopes of the circular V-shaped ring surface 14, Figure 1 and will contact with the same at each instant along the two curves 17 and 18, Figure 2 respectively, one curve for each side of the thread. Said curves of momentary contact are known in mathematics as the "characteristics" of the generated surface and have the interesting property that they lie both in the generating and the generated surface in their entire lengths. Inasmuch as the generating surface on one side of the worm thread is the convex face of a circular cone, and on the other side a concave face of another cone, it follows that the new thread surfaces are entirely built up from a series of curves, all said curves having the common property in that they lie in a conical surface. The two curves 17 and 18, however, will not be alike or symmetrical and, furthermore, their lengths and curvatures will also continually change as the worm 11 is rotated and translated lengthwise as already stated.

As is seen in Figure 1 the circular orbit 14 in which the generating tools are translated, is tangent to the thread helix at the point A in the midplane and interferes with the said helix at the point C on approach and the point D on recess. As the interferences at C and D are not alike it follows that the thread contours, as measured in the midplane, will not be symmetrical to each other with the consequence that the worm thread profiles as measured in the midplane are of a variable contour and are not alike at the driving and the coasting sides.

Figures 3 and 4 diagrammatically show in two projections the method of applying a Gleason cutter 19 to the generation of the threads 12 of the globoid worm 11. During this process the cutter 19 rotates about its stationary axis 20, Figure 3 and the worm 11 rotates about the axis 15 and is translated about the center E in a circular path. The relative position of the cutter with respect to the worm at the end of the generative movement is shown with dotted lines at F, Figure 3.

The method of offsetting the axis of the cutter relative to the axis of the worm is best seen in Figure 4. The cutter is adjusted so that the centerline of its cutting circle passes through the point A of the worm, and the center H of the said circle is offset relative to the axis 15 in order to produce the desired helical angle G.

A worm gear adapted to mesh with the new globoid worm 11 is diagrammatically shown in Figures 5 and 6. The gear 21 has a plurality of circular teeth 22 formed about its circumference. It is to be noted that said teeth are not of a generated tooth form but are simply cut into the blank at spaced intervals by means of a circular cutter, the blank standing still during each such cut. As these teeth 22 are inclined at the desired helical angle relative to the gear axis 23 as indicated at J, Figure 5, it follows that they may be classified as curved hyperboloidal rack teeth and the gear in its outward appearance will resemble the gorge portion of a hyperboloid of revolution, i. e. it will be hollow in its midplane, as indicated at K, Figure 5.

Figure 7 shows on an enlarged scale the formation of a single tooth 22 of the gear 21. The body of said tooth is a segment of a V-shaped circular ring and may be swept by means of the tool 24 when said tool is moved in a circular path.

The theory of this gearing requires that the curved tooth 22, Figure 7 be of exactly the same curvature, thickness, etc. as the cutting path of the cutter 19, Figure 3. This may be accomplished by the selection of two complementary cutters, one to cut the worm and the other the gear. As illustrated in Figure 8, the cutters 19 and 24 are of exactly the same diameter and are complementary to each other, i. e. when superposed one over the other they will have a complete surface contact. From this we are in a position to show that this method is theoretically correct, i. e. that the finished worm and gear will mesh at a constant velocity and their corresponding teeth will always have a line contact with each other. The method of generating the worm, as already explained, is such that the thread surfaces are the geometrical envelopes (of a single parameter) of the conical cutter surface and must therefore possess characteristics of a conical curve type. As the rotation and the translation of the worm relative to the stationary cutter are timed according to a constant ratio, it also follows that the principle of constant velocities is properly taken care of. On the other hand, the wheel teeth all being the exact reproduction of the cutter and engaging the worm threads in exactly the same manner as the cutter does during the generation, will contact with the worm threads along the same above mentioned series of conical curves.

Figures 9 and 10 show a modification of the first described method of generating the worm 11. The cutter 25 having an axis 26 is no longer a Gleason cutter, but is a conical cutter having its cutting faces disposed in two concentric cones 27 and 28 of different degrees of angularity.

The two axes 26 and 15 of the cutter and worm respectively form now an acute angle M, which angle with a view upon the accuracy of the work to be produced should be selected as near to ninety degrees as practicable. The object of this modification is to sacrifice some of the theoretical exactness of the method for the purpose of a practical convenience in manufacture. As is seen in Figure 9, the body of the cutter 25 points now away from the work thus rendering it possible to support the axis 15 by means of bearings of an ample length and diameter in order to insure the rigidity of the work support during generation.

Figure 10 diagrammatically shows the formation of the modified worm cutter 25 from a given wheel cutter 24. The object is to produce as nearly as possible a surface contact to exist between the two complementary cutting surfaces. While the two surfaces never can agree with a theoretical exactness, however, they may be fitted sufficiently close to each other so as to fall within the practical working tolerances, customary in this class of work.

From the foregoing description, it will be evident that the new process is adapted to grinding as well as to milling operations. Also, the gear member of the drive may be manufactured by some other method than the one described such as, for instance, by the hobbing process in which case the hob should be preferably of an hour-glass shape exactly corresponding in all its principal dimensions to those of the mating worm.

The gear member of the drive may be manufactured in an ordinary milling machine if form-cut as previously described, or in an ordinary hobbing machine if finished by means of an hour-glass hob.

The worm member may be generated in a special machine adapted to generate globoidal worms. A machine of that kind is illustrated and described in my copending application Serial No. 186,514, filed April 25, 1927.

What I claim as my invention is:

1. A worm rotatable about its axis comprising a body, a helical thread thereon so formed that its active surface is capable of contacting at any instant in a line contact with a longitudinally curved rack tooth having a predetermined cross section and a tooth axis conforming with a predetermined plane curve, when the said rack tooth is being rotated in a plane comprising the axis of the worm.

2. A worm rotatable about its axis comprising a body, a helical thread thereon so formed that its active surface is capable of contacting at any instant in a line contact with a longitudinally curved circular rack tooth having a predetermined cross section and radius when the said rack tooth is being rotated in a plane.

3. A globoid worm rotatable about its axis comprising a body, a helical thread so formed that its active surface is capable of contacting at any instant in a line contact with a longitudinally curved rack tooth having a predetermined cross section and a tooth axis conforming with a predetermined plane curve, when the said rack tooth is being rotated in a plane comprising the axis of the worm in a circular orbit about a fixed center.

4. A globoid worm rotatable about its axis comprising a body, a helical thread so formed that its active surface is capable of contacting at any instant in a line contact with a longitudinally curved circular rack tooth having a predetermined cross section and radius when the said rack tooth is being rotated in a plane comprising the axis of the worm in a circular orbit about a fixed center.

5. A globoid worm comprising a body and a thread formed thereon, said thread having two non-symmetrical flanks so formed that one flank is capable of engaging in a line contact at every instant the convex side of a predetermined longitudinally curved circular rack tooth, and the other flank capable of similarly engaging the concave side of the said rack tooth when the said tooth is being rotated in the axial plane of the said worm.

6. A globoid worm, the thread of which has two non-symmetrical flanks so formed that one flank is capable of engaging in a line contact at every instant the convex side of a predetermined longitudinally curved circular rack tooth, and the other flank similarly the concave side of the said rack tooth when the said tooth is being rotated in the axial plane of the said worm in a circular orbit about a fixed center.

7. A globoid worm rotatable about its axis and comprising a helical thread having two flanks, both of which are composed of a series of conical curves, said curves being arranged in such a manner that the worm will have a line contact with the teeth of a mating hyperboloidal wheel, said wheel having a plurality of equi-spaced longitudinally curved rack teeth conforming to a predetermined plane curve when the said wheel rotates about a fixed axis, at a fixed distance and at right angles with respect to the axis of the worm.

8. A globoid worm having its two active surfaces composed of two series of conical curves, convex and concave, respectively, and capable of meshing with a hyperboloidal rack wheel having a plurality of equi-spaced circular teeth, all the said teeth being inclined to their axis of rotation at the same helical angle.

9. A globoid worm having helical threads of a form such as might be generated by selecting a longitudinally curved circular rack tooth, in placing said tooth at an acute angle relative to the midplane, in aligning the curved axis of the tooth with the momentary tangent plane to the globoid surface, in rotating the worm about its axis and in bodily translating the said rack tooth in a timed relation in a circular orbit, in the said midplane and about a fixed axis perpendicular to the said midplane.

10. A pair of mating worm gears operating at a fixed center distance and with their axes disposed at right angles comprising a globoid worm and a mating worm wheel, said wheel comprising a plurality of longitudinally curved rack teeth equally spaced about the gorge portion of a hyperboloid of revolution in such a manner that the curves forming the axes of the teeth all lie in planes tangent to the said hyperboloid, and the angle of inclination of all teeth relative to the axis of rotation is the same.

11. A pair of mating worm gears operating at a fixed center distance and with their axes disposed at right angles comprising a worm having a thread which is wound about the axis of rotation to conform with a globoid helix of constant pitch and has two flanks composed of two series of conical curves, one series being copied from the convex side of a master cone and the other from the hollow side of another master cone, and a mating worm wheel adapted to mesh with the said worm with a line contact at every instant.

12. A pair of mating worm gears comprising a globoid worm and mating worm wheel adapted to mesh with each other with a line contact in which the teeth of the worm wheel are longitudinally curved and have two flanks for each tooth, one formed from the convex side of a cone and the other from the hollow side of another cone.

In testimony whereof I affix my signature.

NIKOLA TRBOJEVICH.